US009354780B2

(12) United States Patent
Miyake et al.

(10) Patent No.: US 9,354,780 B2
(45) Date of Patent: May 31, 2016

(54) GESTURE-BASED SELECTION AND MOVEMENT OF OBJECTS

(71) Applicant: PANASONIC CORPORATION, Osaka (JP)

(72) Inventors: Yuichi Miyake, Osaka (JP); Yoshiki Yamamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 647 days.

(21) Appl. No.: 13/707,157

(22) Filed: Dec. 6, 2012

(65) Prior Publication Data

US 2013/0167084 A1 Jun. 27, 2013

Related U.S. Application Data

(63) Continuation of application No. PCT/JP2012/002460, filed on Apr. 9, 2012.

(30) Foreign Application Priority Data

Dec. 27, 2011 (JP) ................. 2011-285026

(51) Int. Cl.
*G06F 3/01* (2006.01)
*G06F 3/0481* (2013.01)
(Continued)

(52) U.S. Cl.
CPC .......... *G06F 3/0482* (2013.01); *G06F 3/04883* (2013.01); *G06F 3/017* (2013.01); *G06F 3/0481* (2013.01); *G06F 9/4443* (2013.01); *G06F 2203/04808* (2013.01); *G09B 5/14* (2013.01)

(58) Field of Classification Search
CPC ..... G06F 3/017; G06F 3/0481; G06F 9/4443; G06F 2203/04808; G09G 5/14
See application file for complete search history.

(56) References Cited

U.S. PATENT DOCUMENTS

2002/0075333 A1* 6/2002 Dutta .................. G06F 3/04842
715/862
2004/0104894 A1 6/2004 Tsukada et al.
(Continued)

FOREIGN PATENT DOCUMENTS

JP 2001-228971 A 8/2001
JP 2004-013381 A 1/2004
(Continued)

OTHER PUBLICATIONS

Yasushi Kuno et al., "'Icon Throwing' User Interface", Computer software, vol. 13, No. 3, May 15, 1996, p. 38-48, with English translation (p. 38).
(Continued)

*Primary Examiner* — Eric J Bycer
(74) *Attorney, Agent, or Firm* — McDermott Will & Emery LLP

(57) ABSTRACT

An information terminal includes: a display unit which displays one or more objects; a sensor unit which obtains a position of a first point and a position of a second point designated by a user on the display unit; and a control unit which selects, from among the one or more objects, at least one object displayed on a straight line determined by the first point and second point, and when the first point or the second point is moved along the straight line, moves the selected object in a direction corresponding to a direction of the movement of the first point or the second point.

19 Claims, 10 Drawing Sheets

(51) Int. Cl.
    *G06F 9/44*    (2006.01)
    *G09B 5/14*    (2006.01)
    *G06F 3/0482*  (2013.01)
    *G06F 3/0488*  (2013.01)

(56) References Cited

U.S. PATENT DOCUMENTS

| | | |
|---|---|---|
| 2005/0248542 A1 | 11/2005 | Sawanobori |
| 2006/0168548 A1* | 7/2006 | Kelley et al. .................. 715/857 |
| 2006/0288314 A1* | 12/2006 | Robertson ........... G06F 3/04812 715/863 |
| 2007/0177803 A1* | 8/2007 | Elias et al. .................... 382/188 |
| 2007/0192749 A1* | 8/2007 | Baudisch ....................... 715/863 |
| 2007/0226652 A1* | 9/2007 | Kikuchi et al. ............... 715/836 |
| 2008/0297482 A1* | 12/2008 | Weiss ............................ 345/173 |
| 2009/0113330 A1* | 4/2009 | Garrison ............... G06F 3/0486 715/769 |
| 2009/0183930 A1* | 7/2009 | Yang et al. .................. 178/18.03 |
| 2010/0192109 A1 | 7/2010 | Westerman et al. |
| 2010/0283750 A1* | 11/2010 | Kang et al. .................... 345/173 |
| 2010/0287470 A1 | 11/2010 | Homma et al. |
| 2010/0295806 A1 | 11/2010 | Homma et al. |
| 2011/0043463 A1 | 2/2011 | Kooh et al. |
| 2011/0080341 A1 | 4/2011 | Helmes et al. |
| 2011/0285665 A1* | 11/2011 | Matsumoto ............ G06F 3/044 345/174 |
| 2012/0026100 A1* | 2/2012 | Migos et al. .................. 345/173 |
| 2012/0210275 A1* | 8/2012 | Park et al. ..................... 715/810 |
| 2012/0216150 A1* | 8/2012 | Wernecke .................... 715/850 |
| 2013/0139079 A1* | 5/2013 | Kitao et al. ................... 715/764 |

FOREIGN PATENT DOCUMENTS

| | | |
|---|---|---|
| JP | 2004-185258 A | 7/2004 |
| JP | 4395408 B2 | 1/2010 |
| JP | 2010-086064 A | 4/2010 |
| JP | 2010-271940 A | 12/2010 |
| JP | 2010-271982 A | 12/2010 |

OTHER PUBLICATIONS

International Search Report mailed Jun. 26, 2012 issued in corresponding International Application No. PCT/JP2012/002460.

* cited by examiner

GESTURE-BASED SELECTION AND MOVEMENT OF OBJECTS

CROSS REFERENCE TO RELATED APPLICATIONS

This is a continuation application of PCT International Application No. PCT/JP2012/002460 filed on Apr. 9, 2012, designating the United States of America, which is based on and claims priority of Japanese Patent Application No. 2011-285026 filed on Dec. 27, 2011. The entire disclosures of the above-identified applications, including the specifications, drawings and claims are incorporated herein by reference in their entirety.

FIELD

The present invention relates to an information terminal, a method of controlling an information terminal, and a program for controlling an information terminal.

BACKGROUND

In a conventional method of controlling a touch-panel information terminal, an icon is selected and the selection is confirmed based on the moving direction between touch points (for example, see Patent Literature 1). When a user moves the user's finger from a coordinate point A to a coordinate point B on a screen, keeping the finger in contact with the screen, and further moves the finger from the coordinate point B to a coordinate point C located close to the coordinate point A, still keeping the finger in contact with the screen, the technique disclosed in Patent Literature 1 allows the user to select an icon located in the direction from the coordinate point A to the coordinate point B, so that the user can cause the touch-panel information terminal to perform an operation corresponding to the icon.

CITATION LIST

Patent Literature

[Patent Literature 1] Japanese Patent No. 4395408

SUMMARY

Technical Problem

There is a problem that poor operability of the touch-panel information terminal may cause a feeling of fatigue in users. This problem is notable also with tablet information terminals which are used by many people nowadays, such as smartphones and tablet terminals.

The present invention, conceived to address the problem, has an object of providing an information terminal which allows easy use of objects on screen.

Solution to Problem

In order to achieve the above object, an information terminal according to an aspect of the present invention includes: a display unit configured to display one or more objects; a sensor unit configured to obtain a position of a first point and a position of a second point designated by a user on the display unit; and a control unit configured to (i) select, from among the one or more objects, at least one object displayed on a straight line determined by the first point and second point, and (ii) when the first point or the second point is moved along the straight line, move the selected object in a direction corresponding to a direction of the movement of the first point or the second point.

It should be noted that these exemplary embodiments of the present invention can be implemented either generally or specifically as a system, a method, an integrated circuit, a computer program, a recording medium, or any combination of a system, a method, an integrated circuit, a computer program, and a recording medium.

Advantageous Effects

According to an aspect of the present invention, an object displayed on an information terminal can be easily handled. Specifically, a user can move an icon out of reach of the user's fingers toward and away from the user by a small hand motion. With this, the user will feel less fatigue.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS (Underlying Knowledge Forming Basis of the Present Invention)

The inventors have found the following problem.

A known conventional touch-panel information terminal includes an interface device in which a display and a touch panel are layered. The display displays icons (also referred to as objects) which allow the users to provide input appropriate in context. When a user gives a touch to an icon, the touch panel detects the touch, and the touch is recognized as a selection of the icon so that input processing corresponding to the selection is executed.

On the other hand, there is a problem that a touch-panel information terminal with a large display may have poor operability and thus cause a feeling of fatigue in users. Such a touch-panel information terminal requires users to make a large hand motion to select an icon. Furthermore, users cannot even select icons out of the reach of the users.

Figure 11:
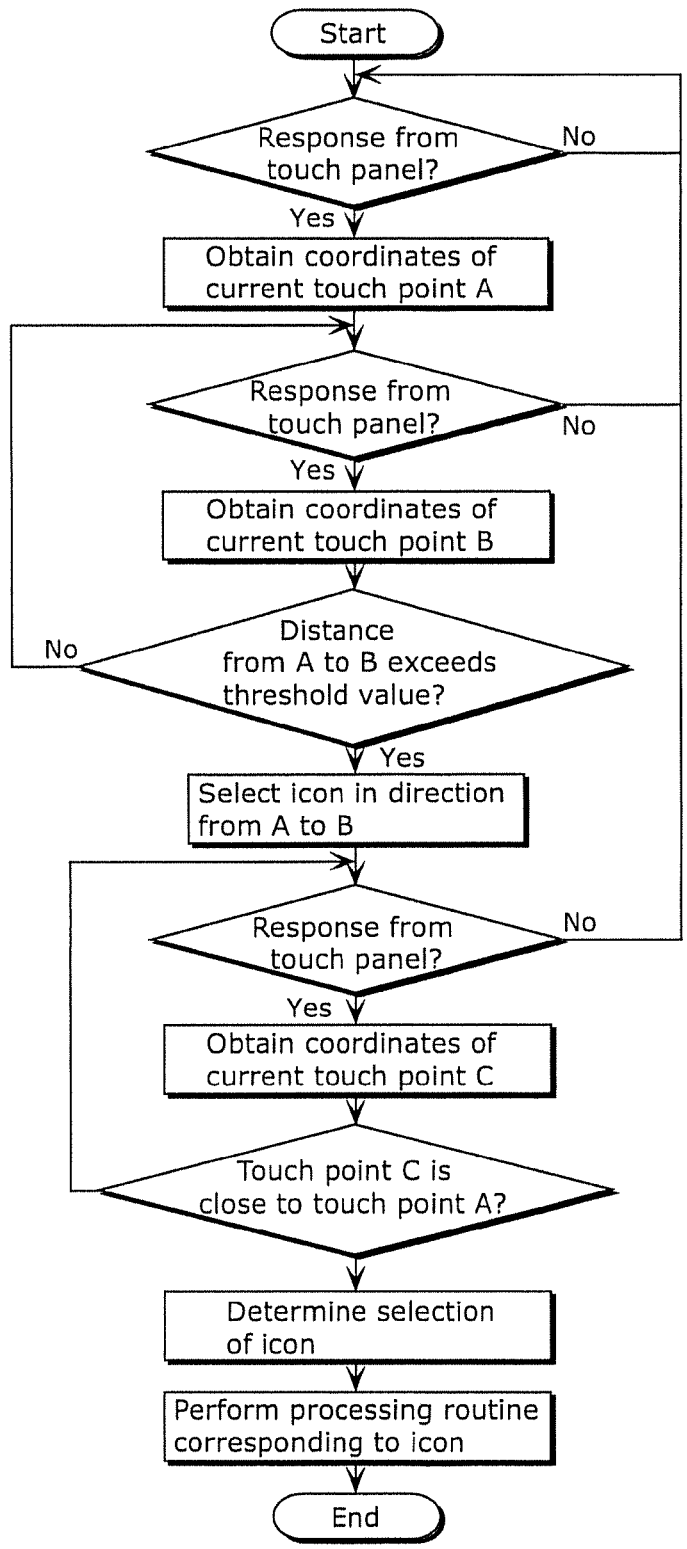
FIG. 11 is a flowchart of operation of a conventional touch-panel information terminal.

There is a proposed touch-panel information terminal on which an icon is selected and the selection is determined based on the moving direction of a touch point (for example, see Patent Literature 1). FIG. 11 is a flowchart for a conventional touch-panel information terminal disclosed in Patent Literature 1.

When a user moves the user's finger from a coordinate point A to a coordinate point B on a screen, keeping the finger in contact with the screen, and further moves the finger from the coordinate point B to a coordinate point C located close to the coordinate point A, still keeping the finger in contact with the screen, the processing shown in FIG. 11 is executed so that an icon located in the direction from the coordinate point A to the coordinate point B is selected and processing corresponding to the icon is executed.

As described above, there is a problem that poor operability of the touch-panel information terminal may cause a feeling of fatigue in users. This problem is notable also with tablet information terminals which are used by many people nowadays, such as smartphones and tablet terminals.

A touch-panel information terminal to which the technique disclosed in Patent Literature 1 is applied to solve the problem will have poor operability. This is because the user's operation disclosed in Patent Literature 1 is not distinguishable from what is called flicking, which is a typical operation performed for screen scroll on smartphones and tablet terminals. Users therefore cannot scroll on the screen of a smartphone or a tablet terminal to which the technique disclosed in Patent Literature 1 is applied.

This technique also requires a user to cancel a touching operation and give a new touch when the touching operation is wrongly performed. For example, when a user's finger which the user is moving along the screen while keeping it in contact with the screen from a coordinate point A to select an object reaches a coordinate point B, the information terminal recognizes an icon which a user is selecting and determining the selection. However, if the user notices that a wrong icon is selected because of a wrong operation of the user, the user needs to cancel the touching operation and perform another touching operation. The technique disclosed in Patent Literature 1 thus leaves the above problem unsolved.

It is therefore desirable to enable easy handling of objects displayed on an information terminal.

In order to solve the problem, provided is an information terminal according to an aspect of the present invention which includes: a display unit configured to display one or more objects; a sensor unit configured to obtain a position of a first point and a position of a second point designated by a user on the display unit; and a control unit configured to (i) select, from among the one or more objects, at least one object displayed on a straight line determined by the first point and second point, and (ii) when the first point or the second point is moved along the straight line, move the selected object in a direction corresponding to a direction of the movement of the first point or the second point.

With this, it is possible for the user to select, as a target object, an object located away on a straight line determined by two points which the user designates on the display unit (touch panel) using the user's fingers. It is also possible for the user to move the target object in a direction corresponding to a movement of a finger by moving either of the fingers along the straight line determined by the two points on the display unit Specifically, the user can move the target object toward or away from the user by using the two points positioned between the user and the position of the target object. The objects displayed on the information terminal are thus easy for the user to handle.

For example, when the first point or the second point is moved along the straight line, the control unit is configured to move the selected object in the direction corresponding to the direction of the movement of the first point or the second point such that a proportion of a distance of the movement of the first point or the second point to a distance between the first point and the second point equals a proportion of a distance of the movement of the selected object to a distance between the selected object and the first point or the second point.

With this, it is possible for the user to handle a target object which naturally moves according to the amount of a movement of the user's finger. A finger of one user and a corresponding finger of another user are different in length, and are therefore different in the absolute amount of a movement in the same motion. On the other hand, the length of fingers and the absolute amount of a movement of the fingers are correlative. It is therefore possible to allow each user to move a target object with a natural feeling about the amount of a movement of the target object in relation to the amount of a movement of the user's finger. The objects displayed on the information terminal are thus easy for the user to handle.

For example, when the first point or the second point is moved along the straight line, the control unit is configured to move all the at least one selected object at once in the direction corresponding to the direction of the movement of the first point or the second point.

With this, it is possible for the user to move a target object toward or away from the user without moving a touch point up to the destination of the object. The objects displayed on the information terminal are thus easy for the user to handle.

For example, (i) when at least one of the first point and the second point is moved not along the straight line, the control unit is configured to select, from among the one or more objects, the at least one object that is displayed within a region which is a locus of the straight line determined by the first point and the second point and moving along with the movement of the at least one of the first point and the second point, and (ii) when at least one of the first point and the second point is moved along the straight line, the control unit is configured to move the selected object in the direction corresponding to the direction of the movement of the first point or the second point.

With this, it is possible for the user to select an object by designating two points on the display unit (touch panel) of the information terminal and moving the points, and finally select the object selected during the movement of the points. It is also possible for the user to move the object selected by the operation as in the above configurations. The objects displayed on the information terminal are thus easy for the user to handle.

For example, (i) when at least one of the first point and the second point is moved not along the straight line, the control unit is configured to select, from among the one or more objects, the at least one object that is displayed on the straight line determined by the first point and the second point, and (ii)

when at least one of the first point and the second point is moved along the straight line, the control unit is configured to move the selected object in the direction corresponding to the direction of the movement of the first point or the second point.

With this, it is possible for the user to select an object by designating two points on the display unit (touch panel) of the information terminal and moving the points, and finally select the object selected at the end of the movement of the points. It is also possible for the user to move the object selected by the motion as in the above configurations. The objects displayed on the information terminal are thus easy for the user to handle.

For example, the display unit is configured to display the selected object and the object not selected on the display unit differently in appearance.

With this, it is possible for the user to distinguish a target object from others by appearance even when the objects are located away from the user and apart from the user's finger. The objects displayed on the information terminal are thus easy for the user to handle.

For example, the display unit is configured to display the straight line.

With this, it is possible for the user to see which one among objects located away from the user is a target object using the straight line. The objects displayed on the information terminal are thus easy for the user to handle.

For example, the information terminal further includes an execution unit configured to execute an operation corresponding to the selected object when the distance between the first point and the second point becomes shorter or equal to a threshold value as a result of the moving of at least one of the first point and the second point.

For example, the information terminal further includes an execution unit configured to execute an operation corresponding to the selected object when at least one of the first point and the second point is moved and subsequently held at a same position for a predetermined period of time.

With this, it is possible for the user to perform a series of operations starting from moving a target object toward the user up to causing the information terminal to perform an operation corresponding to the object by a series of motions of the user's fingers. The objects displayed on the information terminal are thus easy for the user to handle.

For example, after the execution unit executes the operation, the control unit is configured to move the object corresponding to the operation back to a previous position of the object, the previous position being a display position of the object before at least one of the first point and the second point is moved.

For example, when the selected object is a plurality of the objects, an execution unit is configured to execute an operation corresponding to part of the selected objects, and the control unit is configured to subsequently move the object displayed on the display unit and not corresponding to the executed operation back to an previous position of the object, the previous position being a position of the object before at least one of the first point and the second point is moved.

With this, it is possible for the information terminal to move the object moved toward the user back to its previous position. This prevents unwanted change in the layout of on-screen objects.

For example, when the control unit selects, as the object, an icon associated with a predetermined application, the execution unit is configured to execute the predetermined application.

With this, it is possible for the user to cause the information terminal to execute an application corresponding to the object which the user has moved by the series of operations. The objects displayed on the information terminal are thus easy for the user to handle.

For example, wherein when the control unit selects, as the object, an icon associated with predetermined document data or predetermined image data, the execution unit is configured to cause the display unit to display the document data or the image data.

With this, it is possible for the user to cause the information terminal to display document data or image data represented by an object which has just been moved by the user by the series of operations so that the user can use the data. The objects displayed on the information terminal are thus easy to handle and useful to the user.

A method of controlling an information terminal according to an aspect of the present invention includes: displaying one or more objects; obtaining a position of a first point and a position of a second point designated by a user; and (i) selecting, from among the one or more objects, at least one object displayed on a straight line determined by the first point and second point obtained in the obtaining, and (ii) when the first point or the second point is moved along the straight line, moving the selected object in a direction corresponding to a direction of the movement of the first point or the second point.

This produces the same advantageous effects as the above-described information terminal.

For example, (i) when at least one of the first point and the second point is moved not along the straight line, the at least one object is selected from among the one or more objects, the selected object being displayed within a region which is a locus of the straight line determined by the first point and the second point and moving along with the movement of the at least one of the first point and the second point, and (ii) when at least one of the first point and the second point is moved along the straight line, the selected object is moved in the direction corresponding to the direction of the movement of the first point or the second point.

This produces the same advantageous effects as the above-described information terminal.

The present invention is implemented not only as a device but also as a method including units which constitute the device as steps, as a program which causes a computer to execute the steps, a computer-readable recording medium such as a CD-ROM on which the program is recorded, or information, data, or a signal which indicates the program. The program, the information, the data, and the signal may be distributed via a communication network, such as the Internet.

The following describes embodiments of the present invention with reference to the drawings.

Each of the exemplary embodiments described below shows a preferable example. The numerical values, shapes, materials, structural elements, the arrangement and connection of the structural elements, steps, the processing order of the steps etc. shown in the following exemplary embodiments are mere examples, and therefore do not limit the scope of the present invention. Therefore, among the structural elements in the following exemplary embodiments, structural elements not recited in any one of the independent claims defining the most generic part of the present invention are described as structural elements included in more preferable embodiments.

Note that the same components may be denoted with the same reference signs and therefore the descriptions thereof may be omitted.

Figure 1:
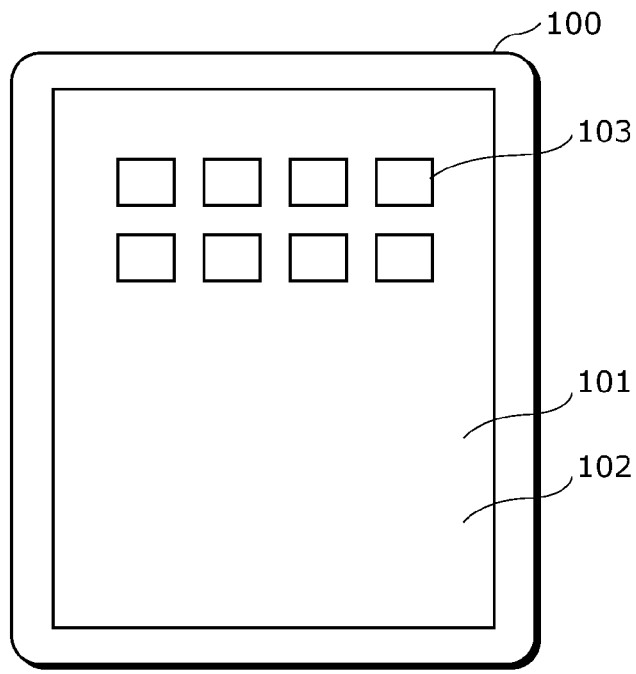
FIG. 1 illustrates an external view of an information terminal according to Embodiment 1 of the present invention.
Figure 2A:
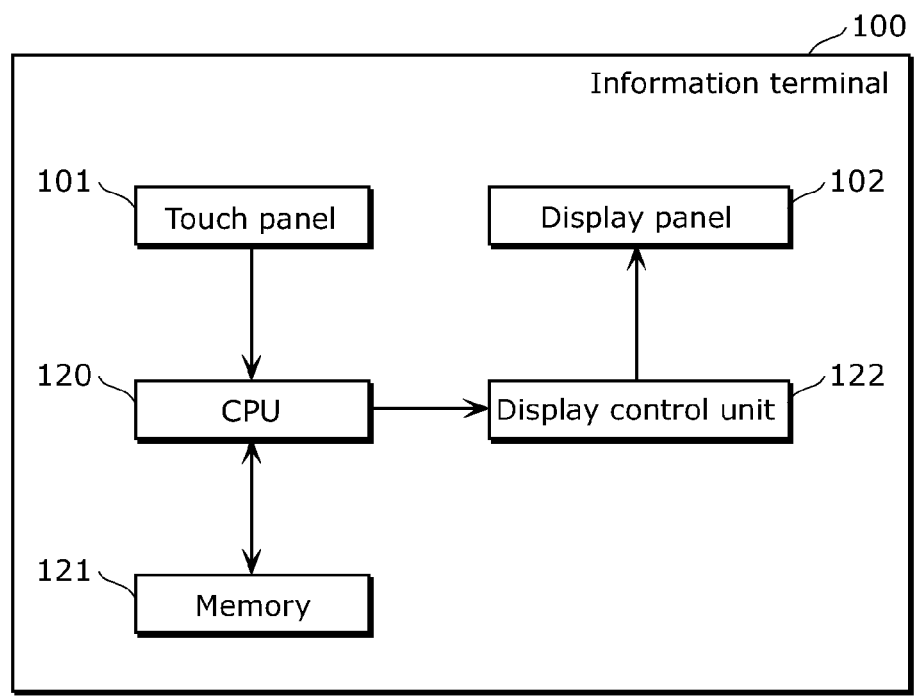
FIG. 2A is a block diagram illustrating a hardware configuration of the information terminal according to Embodiment 1 of the present invention.

FIG. 1 illustrates an external view of an information terminal 100 according to Embodiment 1. FIG. 2A is a block diagram illustrating a hardware configuration of the information terminal according to Embodiment 1.

The information terminal 100 includes a touch panel 101, a CPU 120, a memory 121, a display control unit 122, and a display panel 102.

The touch panel 101 recognizes the position of a point (touch point) designated by a user touching the touchscreen 101 with a finger or the like (touching operation). There are different methods of recognizing a position of a touch point, such as capacitive sensing, resistive sensing, ultrasonic sensing, and optical sensing. When a user gives a plurality of touches at the same time onto the touch panel 101, the touch panel 101 recognizes each touch point.

The CPU 120 identifies a motion of the user based on input information received from the touch panel 101 and determines display positions of operation icons 103 as necessary.

The display control unit 122 displays the operation icons 103. Upon receiving a new display position from the CPU 120, the display control unit 122 changes the display based on the display position.

The display panel 102 receives what to be displayed such as a graphical user interface (GUI), a still image or a video from the display control unit 122 and displays it. Examples of the display panel 102 include a liquid crystal display and an organic light-emitting diode display. Generally, the display panel 102 and the touch panel 101 are laminated so that the touch panel 101 recognizes a user's touch on an object such as the operation icon 103 displayed on the display panel 102.

The memory 121 is a storage area which the CPU 120 uses for temporary storage in execution of a program.

Figure 2B:
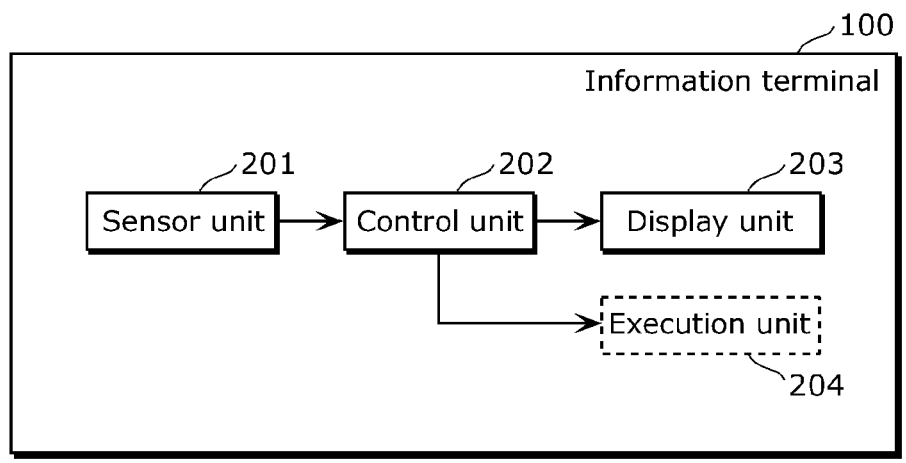
FIG. 2B is a block diagram illustrating a functional configuration of the information terminal according to Embodiment 1 of the present invention.

FIG. 2B is a block diagram illustrating a functional configuration of the information terminal 100 according to Embodiment 1 of the present invention. As shown in FIG. 2B, the information terminal 100 includes a sensor unit 201, a control unit 202, and a display unit 203. The information terminal 100 may further include an execution unit 204.

When a user designates a point on the display unit, the sensor unit 201 obtains the position of the point. The sensor unit 201 is, for example, the touch panel 101.

The control unit 202 controls objects displayed on the display unit 203 according to a position of a point obtained by the sensor unit 201 or the amount of a movement of the point. The control unit 202 is, for example, the CPU 120, the memory 121, and the display control unit 122.

The display unit 203 displays objects. The display unit 203 is, for example, the display panel 102.

The execution unit 204 performs an operation corresponding to each object.

Examples of the object include icons (or shortcuts, aliases, and links) associated with applications, icons associated with document data or image data, operation buttons, and on-screen objects indicating certain functions.

Examples of the operation corresponding to an object include execution of an application associated with the object, display of document data or image data associated with the object, an operation performed in response to pressing of the object which is an operation button, and execution or display of a function indicated by the object.

Processing of the information terminal in the above-described configuration will be described below with reference to FIG. 3 to FIG. 6A.

Figure 3:
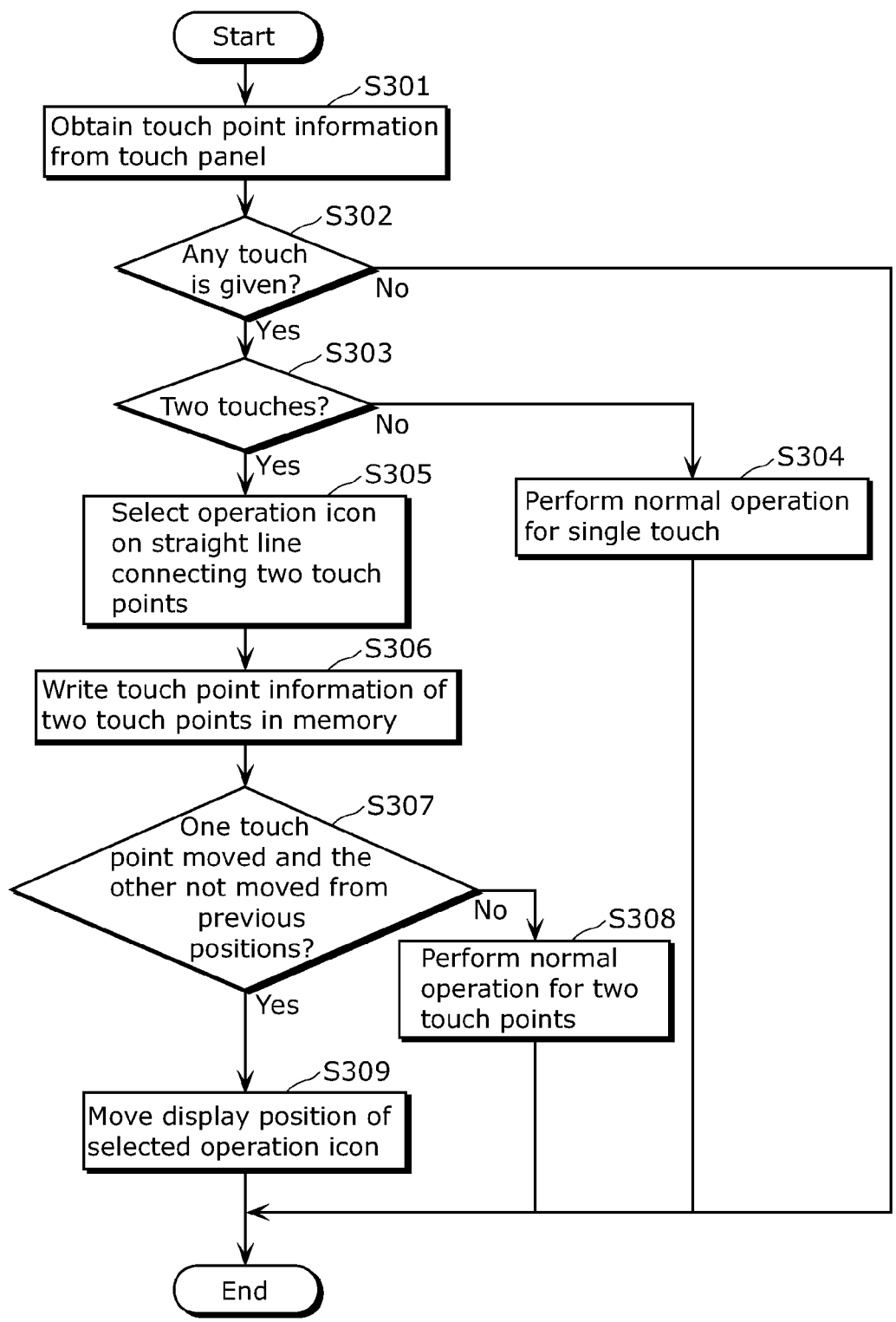
FIG. 3 is a flowchart of processing performed by the information terminal according to Embodiment 1 of the present invention.

FIG. 3 is a flowchart of the processing performed by the information terminal according to Embodiment 1. The series of steps illustrated in FIG. 3 is hereinafter referred to as a cycle.

Figure 4:
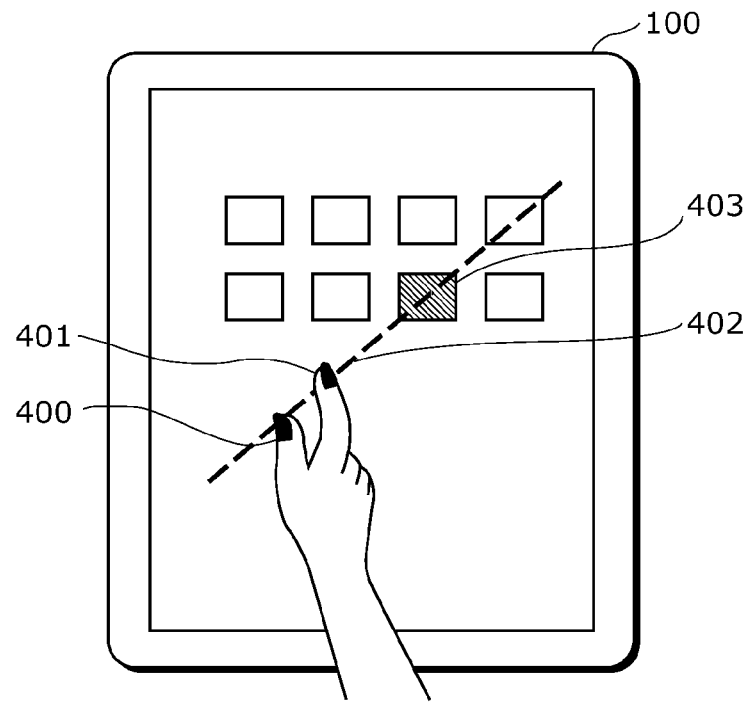
FIG. 4 illustrates a GUI which is displayed on a display according to Embodiment 1 of the present invention.
Figure 5:
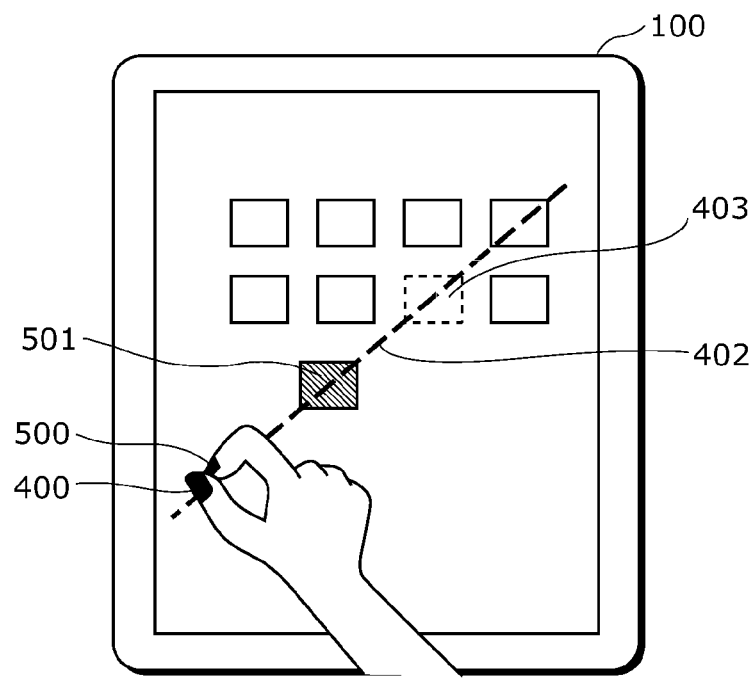
FIG. 5 illustrates the GUI which is displayed on the display according to Embodiment 1 of the present invention.
Figure 6A:
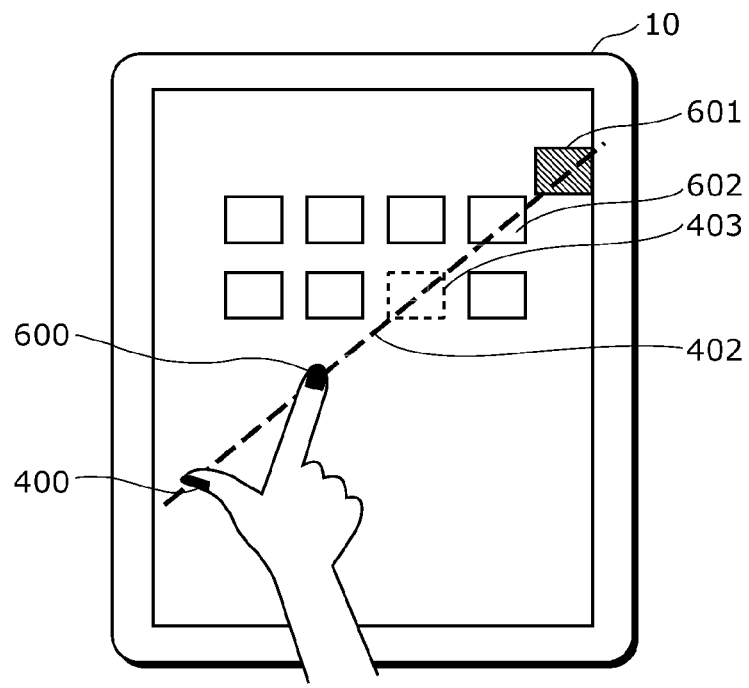
FIG. 6A illustrates the GUI which is displayed on the display according to Embodiment 1 of the present invention.

FIG. 4, FIG. 5, and FIG. 6A illustrate touching operations performed on the touch panel 101 by an user and a GUI which is displayed on the display panel 102 and changes in response to the touching operations according to Embodiment 1.

First, the touch panel 101 recognizes a touch given by a user and obtains information on the position of the touch point (touch point information) of the touch (S301). The obtained touch point information and the total number of items of the touch point information are sent to the CPU 120.

Next, the CPU 120 determines whether or not any touch is given, that is, whether or not the total number of items of the touch point information is one or larger (S302).

When the total number of items of the touch point information is not one or larger, that is, when the total number of items of the touch point information is zero (S302, No), the CPU 120 ends the cycle.

When the number of items of the touch point information is one or more, (S302, Yes), the CPU 120 further determines whether or not there are two touches, that is, whether or not the total number of items of the touch point information is two (S303).

When the total number of items of the touch point information is two (S303, No), the CPU 120 performs a normal operation for a single touch (S304), and ends the cycle. The normal operation for a touch is, for example, starting an application upon selection of an application icon, or executing a function upon selection of a button in an application. In some cases, the CPU 120 performs nothing for a touch.

When the total number of items of the touch point information is two (S303, Yes), the CPU 120 instructs the display control unit 122 to display a straight line 402 passing through a touch point 400 and a touch point 401 as shown in FIG. 4. In addition, the CPU 120 changes the operation icon 403 on the straight line 402 into a status of being selected and instructs the display control unit 122 to display a red frame around the operation icon 403. When there are two or more operation icons on the straight line 402, the CPU 120 instructs the display control unit 122 to display a red frame around the operation icon 403 which is closest to the touch point 400 or the touch point 401 among the operation icons on the straight line 402. Upon receiving the instruction, the display control unit 122 changes the display on the display panel 102. The user then views the operation icon 403 in the status of being selected. Furthermore, the CPU 120 writes the operation icon 403 in the status of being selected in the memory 121 (S305). The red frame around the operation icon 403 is provided to indicate to the user that the operation icon 403 is selected. The frame may be displayed in any color. It is also possible to apply any appearance to the operation icon 403 without using such a frame or even apply no special appearance as long as the user can recognize that the operation icon 403 is selected.

The straight line 402 may be a solid straight line, an interrupted straight line, or a straight line having other appearance. Such an indication is not necessary when the user can mentally recognize a straight line connecting the touch points 400 and 401.

Next, the CPU 120 writes the touch point information of the touch point 400 and the touch point information of the touch point 401 in the memory 121 (S306).

Next, the CPU 120 compares touch point information of the two touch points written in the memory in a previous cycle with the touch point information of the two touch points written in the memory 121 in the current cycle (S307).

When the comparison shows that both or none of the touch points 400 and 401 (S307, No) has moved, the CPU 120 performs a normal operation for two simultaneous touches (S308). The normal operation for two simultaneous touches is, for example, scaling of a picture on the display panel. In some cases, the CPU 120 performs nothing for two simultaneous touches.

When the comparison shows that only one of the touch points 400 and 401 has moved and the other not (S307, Yes), the CPU 120 instructs the display control unit 122 to move the operation icon 403 in a direction parallel to the straight line 402 by a distance corresponding to the amount of displacement in a direction parallel to the straight line 402 as a result of the movement. Upon receiving the instruction, the display control unit 122 changes the display on the display panel 102 (S309). FIG. 5 shows an exemplary result of the processing. The touch point 401 has moved to a touch point 500, the operation icon 403 is accordingly moved to the position indicated by an operation icon 501.

When the direction of a movement of a touch point is parallel to the straight line 402, the operation icon 403 is moved in a direction parallel to the straight line 402 by a distance corresponding to the amount of the motion of the touch point.

When the direction of a movement of a touch point is not exactly but approximately parallel to the straight line 402, the operation icon 403 may be moved in a direction parallel to the straight line 402 by a distance corresponding to a component of the movement in a direction parallel to the straight line 402. A movement of a touch point which can be determined to be approximately parallel is, for example, a movement in a direction at 30 degrees or less from the straight line 402.

When the touch point 400 has moved toward the touch point 401 in the FIG. 4, the operation icon 403 may be moved away from the touch point 401. When the touch point 400 has moved away from the touch point 401 in the FIG. 4, the operation icon 403 may be moved toward the touch point 401.

When a user moves a touch point along the straight line 402, a plurality of the operation icons 403 may be moved to a destination at once. The destination is, for example, the touch point 400 which remains at the same position. Optionally, such a movement may be made upon a flick (a quick stroke on a display panel with a finger).

Then, one cycle ends.

The information terminal 100 periodically performs the cycle of the steps. An operation icon selected by designating two touch points is thereby moved toward the touch points. The information terminal 100 thus allows users to handle operation icons by a lighter operation with less fatigue.

Specifically, a user decides an operation icon 403 to touch, and touches a destination (touch point 400) on the touch panel 101 with a thumb and another point on a line segment 402 connecting the touch point 400 and the operation icon 403 (touch point 401) with a forefinger. Then, the user moves the forefinger toward the thumb while keeping the forefinger in contact with the touch panel 101. The information terminal 100 accordingly moves the operation icon 403 to a position 501 so that operation icon 403 comes close to the thumb.

When a user selects an operation icon 403 not to touch and touches a point (touch point 400) with a thumb and another point on a line segment 402 connecting the touch point 400 and the operation icon 403 with a forefinger on the touch panel 101, and then moves the forefinger on the touch panel 101 away from the thumb to a touch point 600 while keeping the forefinger in contact with the touch panel 101, the information terminal 100 accordingly moves the operation icon 403 away from the thumb to a position indicated by the operation icon 601 as shown in FIG. 6A. The user thus can handle, as a next target object, an operation icon 602 beyond the operation icon 403 not to touch.

Figure 6B:
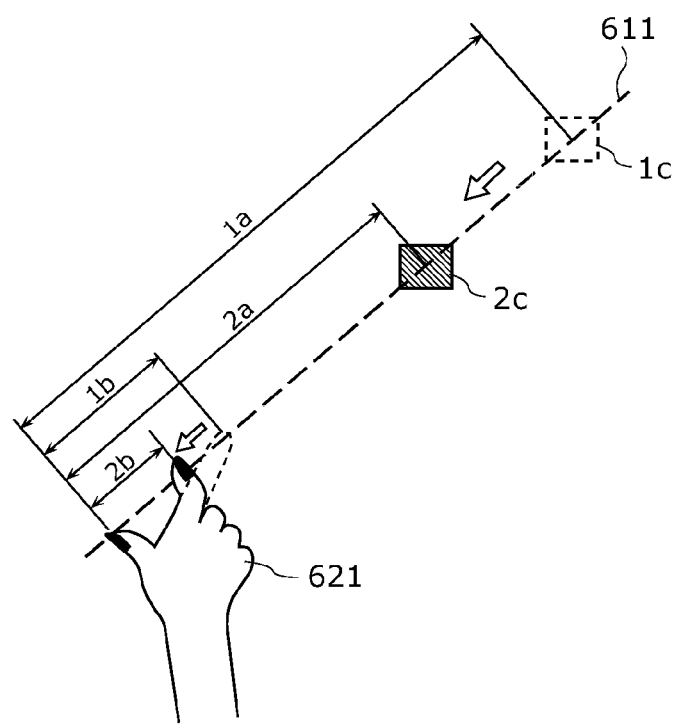
FIG. 6B illustrates an example of a movement of an object according to Embodiment 1 of the present invention.
Figure 6C:
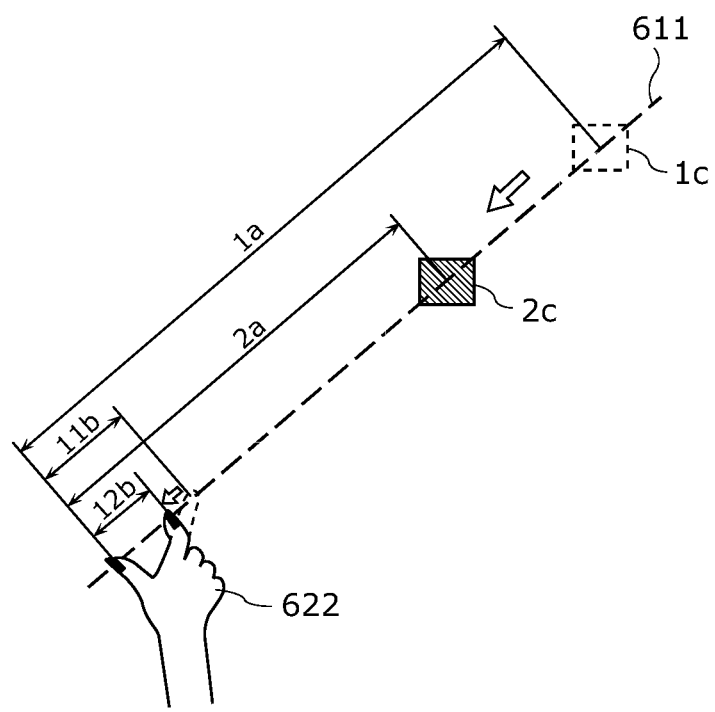
FIG. 6C illustrates another example of a movement of an object according to Embodiment 1 of the present invention.

The amount of a movement of the operation icon may be determined using a method as follows. FIG. 6B and FIG. 6C each illustrate an example of a movement of an object according to Embodiment 1 of the present invention. In each of the cases shown in FIG. 6B and FIG. 6C, a user touches the touch panel 101 with a thumb and a forefinger and moves the forefinger toward the thumb to move an operation icon 1c toward the hand of the user. The user in FIG. 6B has a relatively large hand 621 and the user in FIG. 6C has a relatively small hand 622.

As illustrated in FIG. 6B, a distance 1b is indicated by the thumb and the forefinger of the hand 621 of the user, and the operation icon 1c at a distance 1a from the thumb is moved on and along a straight line 611. In the moving, the distance between the thumb and the forefinger becomes a distance 2b, and the operation icon is moved to the position 2c at a distance 2a from the thumb. The distances may have a relationship represented by $2b/1b=2a/1a$.

As illustrated in FIG. 6C, a distance 11b is indicated by the thumb and the forefinger of the hand 622 of the user, and the operation icon 1c at a distance 1a from the thumb is moved on and along a straight line 611. In the moving, the distance between the thumb and the forefinger becomes a distance 12b, and the operation icon is moved to the position 2c at a distance 2a from the thumb. The distances may have a relationship represented by $12b/11b=2a/1a$.

Use of this method of determining the amount of a movement of an operation icon allows both a user with a large hand and a user with a small hand to move operation icons by a motion based on the user's own feeling. Specifically, a user can move operational icons based on the user's own feeling about a proportion ($2b/1b$ or $12b/11b$) of a distance between touch points on a display panel with a thumb and a forefinger after a move to an initial distance therebetween (1b or 11b).

Although the determination in S307 to identify an operation performed by a user is made by comparing touch point information of two touch points between a previous cycle and a current cycle to determine whether or not touch point information of one of the two touch points changes and that of the other does not, it is also possible in Embodiment 1 to identify an operation by determining, for example, whether or not there are changes in information of both touch points.

In the step of moving the display position of the operation icon 403 (S309), it is also possible to move the operation icon 403 to a touch point in one stroke upon detection of a change in a touch point regardless of the amount of a movement of the touch point, instead of determining the amount of a movement of the operation icon 403 depending on a difference between positions of points of touches with a forefinger.

In Embodiment 1, the execution unit 204 may start execution of an operation corresponding to an operation icon when a user touches the operation icon in a predetermined manner after moving the operation icon toward the user. The following are specific examples of the touching operation of a user in the predetermined manner. The execution unit 204 executes an operation corresponding to the operation icon in response to the touching operation.

One example is holding a forefinger on a position for a certain period of time (for example, three seconds) after moving an operation icon toward the user.

Another example is releasing a forefinger from the touch panel after moving an operation icon toward the user.

Another example is moving a forefinger toward a thumb a touch panel until the distance therebetween becomes short to an extent (for example, 10 millimeters) or shorter after moving an operation icon toward the user.

Another example is making a predetermined touching motion with a thumb (for example, flickering in a direction perpendicular to the straight line 402) after moving an operation icon toward the user.

These are part of examples of the predetermined operation. The execution unit 204 may start execution of an operation corresponding to an operation icon upon a user's operation other than the above or any combination of them.

Furthermore, the operation icon moved toward the user according to the touching operation using a forefinger in the above-described manner may be moved back to its previous position after execution of an operation corresponding to the operation icon.

Figure 10:
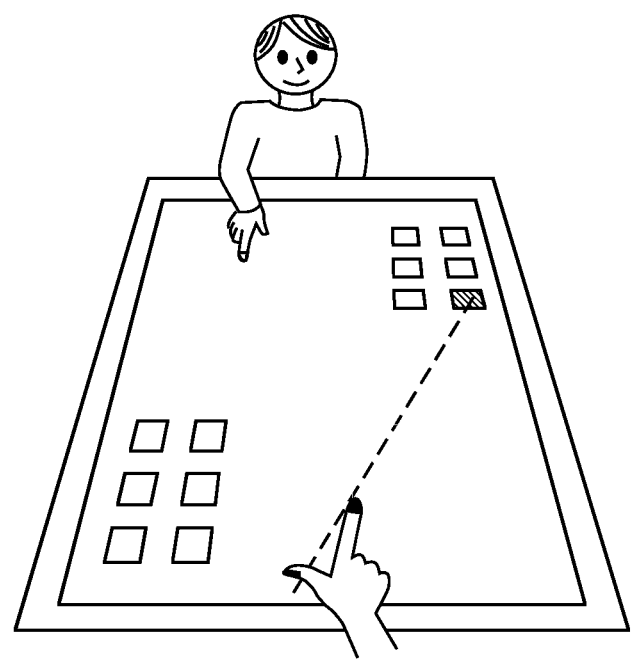
FIG. 10 illustrates an exemplary application of the information terminals according to the present invention.

FIG. 10 illustrates an exemplary application of the technique described in Embodiment 1. The technique according to Embodiment 1 is applicable to such a large information terminal that part of which is out of the reach of a user as illustrated in FIG. 10. The user is allowed to move an object out of the reach toward the user by the above-described motion and cause the information terminal to execute an operation corresponding to the object.

It should be noted that FIG. 10 illustrates a mere exemplary application of the technique. The technique according to Embodiment 1 is also applicable to any information terminal larger or smaller than the one illustrated in FIG. 10.

As described above, it is possible for a user of the information terminal according to an aspect of the present invention to handle a distant object as a target object by designating two points on the display unit (touch panel) of the information terminal using the user's fingers to determine a straight line on which the distant object is located. It is also possible for the user to move the target object in a direction corresponding to a movement of a finger by moving either of the fingers along the straight line determined by the two points on the display unit. Specifically, the user can move the target object toward or away from the user by using the two points positioned between the user and the position of the target object. The objects displayed on the information terminal are thus easy for the user to handle.

It is also possible for the user to handle a target object which naturally moves according to the amount of a movement of the user's finger. A finger of one user and a corresponding finger of another user are different in length, and are therefore different in the absolute amount of a movement in the same corresponding motion. On the other hand, the length of fingers and the absolute amount of a movement of the fingers are correlative. It is therefore possible to allow each user to move a target object with a natural feeling about the amount of a movement of the target object in relation to the amount of a movement of the user's finger. The objects displayed on the information terminal are thus easy for the user to handle.

It is also possible for the user to move the target object toward or away from the user without moving a touch point up to the destination of the object. The objects displayed on the information terminal are thus easy for the user to handle.

It is also possible for the user to distinguish a target object from others by appearance even when the objects are located away from the user and apart from the user's finger. The objects displayed on the information terminal are thus easy for the user to handle.

It is also possible for the user to see which one among objects located away from the user is a target object using the straight line. The objects displayed on the information terminal are thus easy for the user to handle.

It is also possible for the user to perform a series of operations starting from moving a target object toward the user up to causing the information terminal to perform an operation corresponding to the object by a series of motions of the user's fingers. The objects displayed on the information terminal are thus easy for the user to handle.

It is possible for the information terminal to move the object moved toward the user back to its previous position. This prevents unwanted change in the layout of the on-screen objects.

It is also possible for the user to cause the information terminal to execute an application corresponding to the object which the user has moved by the series of operations. The objects displayed on the information terminal are thus easy for the user to handle.

It is also possible for the user to cause the information terminal to display document data or image data represented by an object which has just been moved by the user by the series of operations so that the user can use the data. The objects displayed on the information terminal are thus easy to handle and useful to the user.

Embodiment 2

In the case described in Embodiment 2, touch points are moved and objects on a straight line determined by the touch points being moved or after the moving are selected as target objects.

Figure 7:
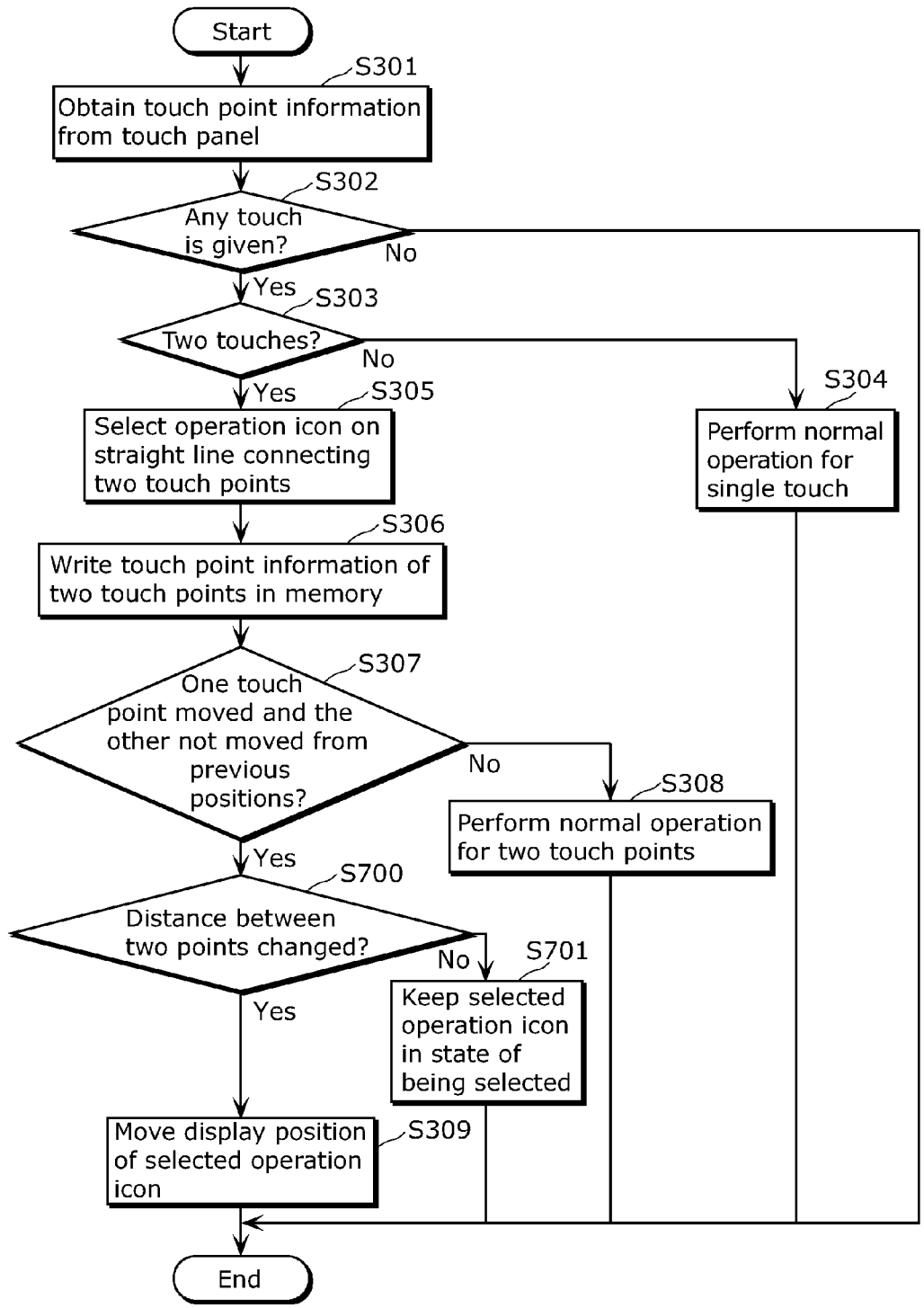
FIG. 7 is a flowchart of processing performed by an information terminal according to Embodiment 2 of the present invention.

FIG. 7 is a flowchart of processing performed by an information terminal having a functional configuration according to Embodiment 2. Description of the steps in common with Embodiment 1 will be omitted.

In Step S307, the CPU 120 compares touch point information obtained in a previous cycle and touch point information obtained in a current cycle. When the comparison shows there has been a change only in the position of one of the touch points but not in the position of the other (S307, Yes), the CPU 120 further determines whether or not the distance between the two touch points in the current cycle has changed from the distance between the two touch points in the previous cycle.

When the distance between the two touch points has changed (S700, Yes), the CPU 120 changes the display position of the operation icon 403 (S309).

Figure 8:
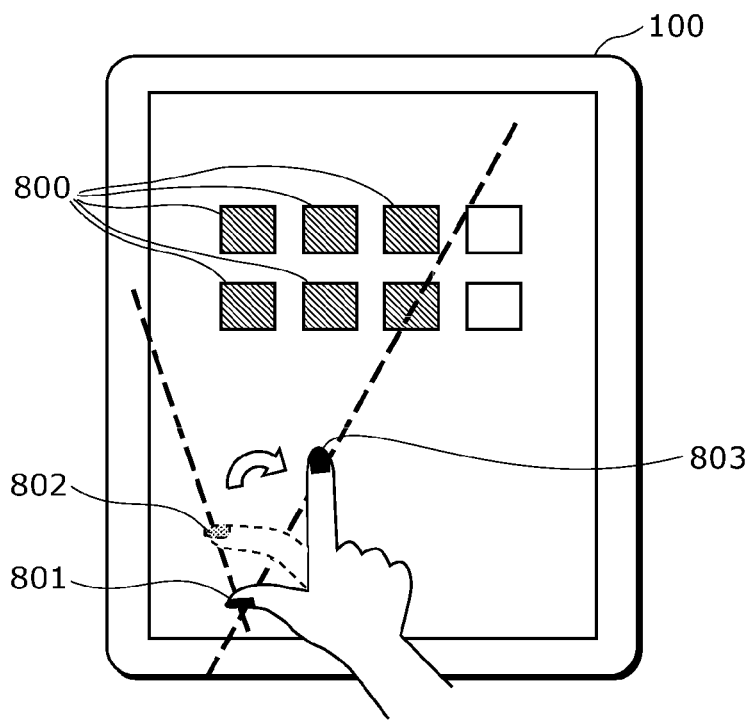
FIG. 8 illustrates a GUI which is displayed on a display according to Embodiment 2 of the present invention.

When the distance between the two touch points has not changed (S700, No), the CPU 120 additionally changes operation icons 800 not selected into the state of being selected at once while keeping the selection of operation icons 800 which have already been in the state of being selected as shown in FIG. 8. In other words, in the case where the distance between the two touch points has not changed, one of the touch points has been moved along the arc of a sector having its vertex at the other touch point. The CPU 120 then changes the operation icons 800 in a sectoral region extended radially from the vertex into the state of being selected.

Figure 9:
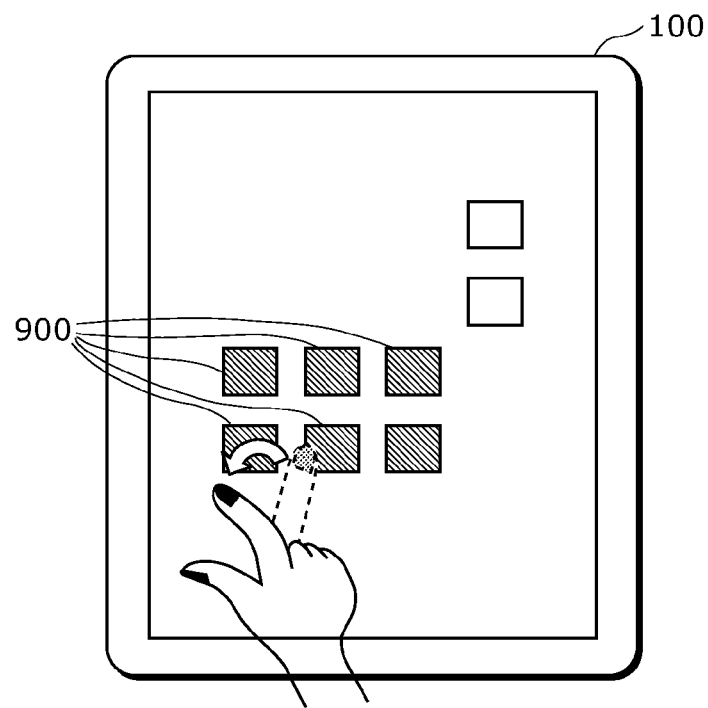
FIG. 9 illustrates the GUI which is displayed on the display according to Embodiment 2 of the present invention.

The display positions of the operation icons being selected are moved in the manner as shown in FIG. 9 (S309).

In this manner, the information terminal 100 periodically performs the cycle of the steps illustrated in FIG. 7. Operation icons selected by moving one of two touch points along an arc are thereby moved toward the touch points at once. The information terminal 100 thus allows users to handle operation icons by a lighter operation with less fatigue.

Specifically, a user decides operation icons 800 to touch, and touches a destination 801 on the touch panel 101 with a thumb and another point on a line segment 802 connecting the touch point on the thumb and one of the operation icons with a forefinger. Next, the user selects all the operation icons 800 to touch by moving the forefinger on the touch panel 101 along an arc so as to pivot the position of the thumb, and then moves the forefinger on the touch panel 101 toward the thumb while keeping the forefinger in contact with the touch panel 101. The information terminal 100 accordingly moves the operation icons 800 to a position 900 toward the thumb.

The operation icons 800 may be changed into a state of being selected not only when only one of two touch points are moved as described above but also when both of the two touch points are moved. In other words, when both of the two touch points are moved, the operation icons 800 displayed in a region which a straight line determined by two touch points and moving along with movement of the two touch points may be selected.

It is also possible to change, into a state of being selected, operation icons 800 displayed within a sector determined using information on positions of three touch points designated using three fingers It is also possible to change, into a state of being selected, an operation icon 800 on a straight line connecting two touch points after at least one of the two touches is moved as described above.

In Embodiment 2, the execution unit 204 may start execution of an operation corresponding to all or part of operation icons when a user touches the operation icons in a predetermined manner after moving the operation icons toward the user.

Furthermore, the operation icons moved toward the user according to the touching operation using a forefinger in the above-described manner may be moved back to their previous positions after execution of operations corresponding to the operation icons.

The operation icons moved toward the user according to the touching operation using a forefinger may be moved back to their previous positions except one of the operation icons after execution of an operation corresponding to the one of the operation icons. In this case, the one of the operation icons is left at the position after being moved.

As described above, it is possible for a user of the information terminal according to an aspect of the present invention to handle a distant object as a target object by designating two points on the display unit (touch panel) of the information terminal using the user's fingers and changing one or more of the positions of the points to finally select objects which have been selected by the changing of the one or more of the positions. Then, it is possible for the user to move the finally selected object. The objects displayed on the information terminal are thus easy for the user to handle.

It is also possible for a user to select an object by designating two points on the display unit (touch panel) of the information terminal and moving the points, and finally select the object selected during the movement of the points. It is also possible for the user to move the object selected by the operation as in the above configurations The objects displayed on the information terminal are thus easy for the user to handle.

It is possible for the information terminal to move the object moved closer to the user back to its previous position. This prevents unwanted change in the layout of the on-screen objects. The touch panels in these exemplary embodiments are described as sensor units for detection of designated points on a display unit. These sensor units need not detect a touch as with the touch panels. Examples of a sensor unit to be included in the information terminal include a sensor unit which detects approximation to the display unit based on change in capacitance, a sensor unit which transmits and receives infrared, and a sensor unit which transmits and receives ultrasonic.

All or part of the information terminal 100 in Embodiment 1 and Embodiment 2 may be implemented as a system large-scale integration (LSI). For example, the information terminal 100 may be a system LSI including the CPU 120 and the display control unit 122.

The system LSI is a super-multifunctional LSI in which constituent units are integrated on a single chip, and specifically is a computer system including a microprocessor, a read-only memory (ROM), and a random-access memory (RAM). The ROM stores a computer program. The microprocessor operates according to the computer program so that the system LSI can perform its function.

The integrated circuit described as a system LSI may be referred to as an IC, an LSI, a super LSI or an ultra LSI depending on the degree of integration. The method of forming integrated circuitry is not limited to use of such LSIs. Dedicated circuitry or a general-purpose processor may be used instead. Also applicable is a field programmable gate array (FPGA), which allows post-manufacture programming, or a reconfigurable processor LSI, which allows post-manufacture reconfiguration of connection and setting of circuit cells therein.

Furthermore, in the event that an advance in or derivation from semiconductor technology brings about an integrated circuitry technology whereby an LSI is replaced, functional blocks may be obviously integrated using such new technology. Application of biotechnology or the like is possible.

Furthermore, the present invention can be implemented not only as an information terminal including the characteristic processing unit but also as a touch panel operation method including the processing units in the information terminal as steps. It can be also implemented as a computer program to cause a computer to execute the steps included in the touch panel operation method. It is needless to say that the computer program can be distributed via computer-readable recording media such as a compact disc read-only memory (CD-ROM) or a communication network such as the Internet.

The present invention is not limited to the above-described embodiments. Although only an exemplary embodiment of present invention has been described in detail above, those skilled in the art will readily appreciate that many modifications are possible in the exemplary embodiments without materially departing from the novel teachings and advantages of this disclosure. Accordingly, all such modifications are intended to be included within the scope of the present invention.

In the exemplary embodiments, each of the constituent elements may be implemented as a piece of dedicated hardware or implemented by executing a software program appropriate for the constituent element. The constituent elements may be implemented by a program execution unit such as a CPU or a processor which reads and executes a software program recorded on a recording medium such as a hard disk or a semiconductor memory. For example, the information terminal in the above-described embodiments is implemented by executing a software program below.

The program causes a computer to execute: displaying one or more objects; obtaining a position of a first point and a position of a second point designated by a user; and (i) selecting, from among the one or more objects, at least one object displayed on a straight line determined by the first point and second point obtained in the obtaining, and (ii) when the first point or the second point is moved along the straight line, moving the selected object in a direction corresponding to a direction of the movement of the first point or the second point.

Furthermore, the program causes a computer to execute: (i) when at least one of the first point and the second point is moved not along the straight line, the at least one object is selected from among the one or more objects, the selected object being displayed within a region which is a locus of the straight line determined by the first point and the second point and moving along with the movement of the at least one of the first point and the second point, and (ii) when at least one of the first point and the second point is moved along the straight line, the selected object is moved in the direction corresponding to the direction of the movement of the first point or the second point.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The information terminals and others according to the aspects of the present invention are applicable to display devices which recognize touching of the display devices with fingertips of users.

The invention claimed:

1. An information terminal comprising:
   a display configured to display one or more objects;
   a sensor configured to obtain a position of a first point and a position of a second point designated by a user on the display; and
   a control unit configured to (i) select, from among the one or more objects, at least one object displayed in a region on a straight line passing through the first point and second point, the region not being located between the first point and the second point and (ii) when the first point or the second point is moved along the straight line, move the selected object in a direction corresponding to a direction of the movement of the first point or the second point.

2. The information terminal according to claim 1, wherein when the first point or the second point is moved along the straight line, the control unit is configured to move the selected object in the direction corresponding to the direction of the movement of the first point or the second point such that a proportion of a distance of the movement of the first point or the second point to a distance between the first point and the second point equals a proportion of a distance of the movement of the selected object to a distance between the selected object and the first point or the second point.

3. The information terminal according to claim 1, wherein:
   the controller is configured to select two or more objects, from the one or more objects, displayed in the region, and
   when the first point or the second point is moved along the straight line, the control unit is configured to move all the two or more selected bjects at once in the direction corresponding to the direction of the movement of the first point or the second point.

4. The information terminal according to claim 1, wherein the contol unit is configured to determine the straight line after the at least one of the first point and the second point is moved.

5. The information terminal according to claim 1, wherein the display is configured to display, when the at least one object is selected, the selected object and remaining one or more objects not selected on the display differently in appearance.

6. The information terminal according to claim 1, wherein the display is configured to display the straight line.

7. The information terminal according to claim 1, further comprising an execution unit configured to execute an operation corresponding to the selected object when a distance between the first point and the second point becomes shorter or equal to a threshold value as a result of the moving of at least one of the first point and the second point.

8. The information terminal according to claim 7, wherein after the execution unit executes the operation, the control unit is configured to move the selected object corresponding to the operation back to a previous position of the selected object, the previous position being a display position of the selected object before at least one of the first point and the second point is moved.

9. The information terminal according to claim 7, wherein:
   the controller is configured to select two or more objects, from the one or more objects, displayed in the region,
   the execution unit is configured to execute an operation corresponding to at least one of the selected two or more objects, and
   the control unit is configured to subsequently move one or more remaining objects, which are displayed on the display and do not correspond to the executed operation, back to a previous position of the one or more remaining objects, the previous position being a position of the one or more remaining objects before at least one of the first point and the second point is moved.

10. The information terminal according to claim 7, wherein when the control unit selects, as the selected object, an icon associated with a predetermined application, the execution unit is configured to execute the predetermined application.

11. The information terminal according to claim 7, wherein when the control unit selects, as the selected object, an icon associated with predetermined document data or predetermined image data, the execution unit is configured to cause the display to display the document data or the image data.

12. The information terminal according to claim 1, further comprising an execution unit configured to execute an operation corresponding to the selected object when at least one of the first point and the second point is moved and subsequently held at a same position for a predetermined period of time.

13. The information terminal according to claim 1, wherein:
    the control unit is further configured to select, from among the one or more objects, at least one object that is displayed within an area which is a part of a locus of the straight line formed by moving at least one of the first point and the second point not along the straight line, and when at least one of the first point and the second point is moved along the straight line, the control unit is configured to move the selected object in a direction corresponding to a direction of the movement of the first point or the second point.

14. An information terminal comprising:
    a display configured to display one or more objects;
    a sensor configured to obtain a position of a first point and a position of a second point designated by a user on the display, thereby determining a straight line passing through the first point and the second point; and
    a control unit configured to (i) select, from among the one or more objects, at least one object that is displayed within a region which is a part of a locus of the straight line formed by moving at least one of the first point and the second point not along the straight line, the region not being located between the first point and the second point, and (ii) when at least one of the first point and the second point is moved along the straight line, the control unit is configured to move the selected object in a direction corresponding to a direction of the movement of the first point or the second point.

15. A method of controlling an information terminal, comprising:
    displaying one or more objects;
    obtaining a position of a first point and a position of a second point designated by a user; and
    (i) selecting, from among the one or more objects, at least one object displayed in a region on a straight line passing through the first point and second point obtained in the obtaining, the region not being located between the first point and the second point, and (ii) when the first point or the second point is moved along the straight line, moving the selected object in a direction corresponding to a direction of the movement of the first point or the second point.

16. A non-transitory computer-readable recording medium for use in a computer, the recording medium having a computer program recorded thereon for causing the computer to execute the method of controlling an information terminal according to claim 15.

17. The method of controlling an information terminal according to claim 15, further comprising:

selecting, from among the one or more objects, at least one object displayed within an area which is a part of a locus of the straight line formed by moving at least one of the first point and the second point, and when at least one of the first point and the second point is moved along the straight line, the selected object is moved in a direction corresponding to a direction of the movement of the first point or the second point.

18. A method of controlling an information terminal, comprising:
    displaying one or more objects;
    obtaining a position of a first point and a position of a second point designated by a user, thereby determining a straight line passing through the first point and the second point; and
    selecting, from among the one or more objects, at least one object displayed within a region which is a part of a locus of the straight line formed by moving at least one of the first point and the second point not along the straight line, the region not being located between the first point and the second point, and (ii) when at least one of the first point and the second point is moved along the straight line, the selected object is moved in a direction corresponding to a direction of the movement of the first point or the second point.

19. A non-transitory computer-readable recording medium for use in a computer, the recording medium having a computer program recorded thereon for causing the computer to execute the method of controlling an information terminal according to claim 18.

* * * * *